United States Patent
Yi et al.

(10) Patent No.: US 8,503,436 B2
(45) Date of Patent: Aug. 6, 2013

(54) METHOD OF TRIGGERING STATUS REPORT IN WIRELESS COMMUNICATION SYSTEM AND RECEIVER

(75) Inventors: Seung June Yi, Anyang-si (KR); Sung Jun Park, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 13/003,246

(22) PCT Filed: Jul. 31, 2009

(86) PCT No.: PCT/KR2009/004279
§ 371 (c)(1),
(2), (4) Date: Jan. 7, 2011

(87) PCT Pub. No.: WO2010/021465
PCT Pub. Date: Feb. 25, 2010

(65) Prior Publication Data
US 2011/0110263 A1    May 12, 2011

Related U.S. Application Data

(60) Provisional application No. 61/090,880, filed on Aug. 21, 2008, provisional application No. 61/098,727, filed on Sep. 19, 2008.

(30) Foreign Application Priority Data

Jun. 22, 2009 (KR) ......................... 10-2009-0055580

(51) Int. Cl.
*H04W 24/10* (2009.01)

(52) U.S. Cl.
USPC ............................................ 370/352; 370/241

(58) Field of Classification Search
USPC .................... 370/231, 331, 242, 252
See application file for complete search history.

(56) References Cited

U.S. PATENT DOCUMENTS 7,447,504 B2    11/2008  Lohr et al.
7,525,908 B2 *   4/2009  Olsson et al. ................. 370/229
(Continued)

FOREIGN PATENT DOCUMENTS

CN    1951043    4/2007
EP    2086258    8/2009
(Continued)

OTHER PUBLICATIONS

Ericsson et al., "E-UTRA MAC Protocol Specification Update," R2-083902, 3GPP TSG RAN2 Meeting #63, Aug. 2008, XP050319092.
Qualcomm Europe et al., "Clarifications and Corrections for HARQ Operation at TAT expiry and RACH Contention Resolution," R2-084765, 3GPP TSG RAN2 Meeting#63, Aug. 2008, XP050319721.
(Continued)

*Primary Examiner* — Hassan Kizou
*Assistant Examiner* — Emmanuel Maglo
(74) *Attorney, Agent, or Firm* — Lee, Hong, Degerman, Kang & Waimey

(57) ABSTRACT

A method and apparatus of triggering a status report in a wireless communication system is provided. A duplicated data block is received. A triggering of a status report is suspended if the duplicated data block requests the status report and a sequence number (SN) of the duplicated data block is equal to or greater than a maximum status transmit state variable. Even if a duplicated data block requests a status report, the status report is triggered after hybrid automatic repeat request (HARQ) reordering is complete.

9 Claims, 8 Drawing Sheets

U.S. PATENT DOCUMENTS

| | | | |
|---|---|---|---|
| 8,111,638 B2 * | 2/2012 | Seok et al. | 370/278 |
| 8,155,016 B2 | 4/2012 | Zhang et al. | |
| 8,274,969 B2 | 9/2012 | Wu | |
| 2007/0047452 A1 * | 3/2007 | Lohr et al. | 370/242 |
| 2007/0291695 A1 * | 12/2007 | Sammour et al. | 370/331 |
| 2008/0043619 A1 * | 2/2008 | Sammour et al. | 370/231 |
| 2008/0225765 A1 * | 9/2008 | Marinier et al. | 370/310 |
| 2008/0285493 A1 * | 11/2008 | Tseng | 370/310 |
| 2009/0040982 A1 * | 2/2009 | Ho et al. | 370/331 |
| 2009/0092076 A1 * | 4/2009 | Zheng et al. | 370/328 |
| 2010/0238799 A1 * | 9/2010 | Sebire | 370/225 |

FOREIGN PATENT DOCUMENTS

| | | |
|---|---|---|
| KR | 10-2006-0115498 A | 11/2006 |
| KR | 10-2007-0031810 A | 3/2007 |
| KR | 10-2007-0102166 A | 10/2007 |
| KR | 10-2008-0066244 A | 7/2008 |
| WO | 2007/111941 | 10/2007 |
| WO | 2009/096751 | 8/2009 |

OTHER PUBLICATIONS

Ericsson, "E-UTRA MAC protocol specification update", R2-083902, 3GPP TSG-RAN2 Meeting #63, 3GPP TSG-RAN2 Meeting #63, Aug. 2008, 34 pages.

The State Intellectual Property Office of the People's Republic of China Serial No. 200980119997.X, Office Action dated Dec. 10, 2012, 7 pages.

United States Patent and Trademark Office U.S. Appl. No. 13/546,679, Notice of Allowance dated Jan. 2, 2013, 10 pages.

Ericsson, et al., "E-UTRA MAC protocol specification update," 3GPP TSG-RAN2 Meeting #63, R2-083902, Aug. 2008, 32 pages.

Qualcomm Europe, et al., "Clarifications and Corrections for HARQ operation at TAT expiry and RACH contention resolution," 3GPP TSG-RAN2 Meeting #63, R2-084765, Aug. 2008, 3 pages.

European Patent Office Application Serial No. 13157004.6, Search Report dated May 7, 2013, 5 pages.

* cited by examiner

US 8,503,436 B2

METHOD OF TRIGGERING STATUS REPORT IN WIRELESS COMMUNICATION SYSTEM AND RECEIVER

CROSS-REFERENCE TO RELATED APPLICATIONS

This application is the National Stage filing under 35 U.S.C. 371 371 of international application No. PCT/KR2009/00004279, filed on Jul. 31, 2009, which claims priority to U.S. provisional application Nos. 61/090,880, filed on Aug. 21, 2008 and 61/098,727, filed on Sep. 19, 2008 and also claims the benefit of earlier filing date and right of priority to Korean Application No. 10-2009-0055580, filed on Jun. 22, 2009, the contents of all of which are hereby incorporated by reference herein in their entireties.

TECHNICAL FIELD

The present invention relates to wireless communications, and more particularly, to a method and apparatus for triggering a status report in a wireless communication system.

BACKGROUND ART

Wireless communication systems are widely used to provide a voice service or a packet service. A multiple access system supports communication to multiple users by sharing available system resources. Examples of the multiple access system include a code division multiple access (CDMA) system, a frequency division multiple access (FDMA) system, a time division multiple access (TDMA) system, an orthogonal frequency division multiple access (OFDMA) system, etc.

3-rd generation partnership project (3GPP) long term evolution (LTE) is an evolution of a universal mobile telecommunication system (UMTS) and is introduced in the 3GPP release 8. The 3GPP LTE uses OFDMA in a downlink, and uses single carrier-FDMA (SC-FDMA) in an uplink. The 3GPP LTE employs multiple input multiple output (MIMO) having 4 antennas. 3GPP LTE-advanced (LTE-A) that is an evolution of the 3GPP LTE has recently been discussed.

Automatic repeat request (ARQ) is an error control mechanism which uses acknowledgment to achieve reliable data transmission. The acknowledgment is a status report message transmitted by a receiver to a transmitter to indicate whether the receiver has successfully received data.

If the ARQ is performed in a radio link control (RLC) layer, hybrid automatic repeat request (HARQ) is performed in a medium access control (MAC) layer that is a lower layer of the RLC layer. The HARQ is a combination of the ARQ and forward error correction (FEC) coding that is an error correction mechanism, and an HARQ acknowledgement (ACK)/negative-acknowledgment (NACK) signal is exchanged in a physical layer. If the received data is successfully decoded, the HARQ ACK/NACK signal is an HARQ ACK signal, and if the received data is unsuccessfully decoded, the HARQ ACK/NACK signal is an HARQ NACK signal.

In the HARQ, the HARQ ACK/NACK signal is periodically/aperiodically transmitted for each HARQ process. On the other hand, in the ARQ, to reduce an overhead caused by a status report, the receiver reports the status report in general when the transmitter requests the status report (this is referred to as polling).

In principle, the ARQ and the HARQ are performed independently from each other. However, since the RLC layer performs the ARQ by receiving a data block from the MAC layer in which the HARQ is performed, an operation error of one layer may affect to the other layer.

The RLC layer may receive a duplicated data block from the MAC layer. For example, an HARQ ACK-to-NACK error may occur when the receiver feeds back an HARQ ACK signal to the transmitter upon receiving an initial data block but the transmitter mistakenly recognizes the HARQ ACK signal as an HARQ NACK signal by being affected by a wireless channel and thus retransmits the same data block as the initial data block. A MAC layer of the receiver may transmit a data block which is duplicated to the initial data block to an RLC layer of the receiver. In this case, if the duplicated data block is a polling data block, that is, a data block for requesting a status report, the RLC layer may duplicatively transmit the status report. This may result in an overhead caused by the redundant status report. In addition, unnecessary retransmission may occur when the receiver reports the status report at a time not desired by the transmitter during the ARQ is performed.

Accordingly, there is a need for a method capable of handling a status report request for a duplicatively received data block.

DISCLOSURE OF INVENTION

Technical Problem

The present invention provides a method of handling a status report request of a duplicatively received data block.

The present invention also provides a receiver of handling a status report request of a duplicatively received data block.

Solution to Problem

In an aspect, a method of triggering a status report in a wireless communication system is provided. The method includes receiving a duplicated data block, and suspending a triggering of a status report if the duplicated data block requests the status report and a sequence number (SN) of the duplicated data block is equal to or greater than a maximum status transmit state variable, the maximum status transmit state variable having a highest possible value of a SN that can be included in the status report.

The SN of the duplicated data block may be within the receiving window. The triggering of the status report may be suspended until the SN of the duplicated data block is less than the maximum status transmit state variable. If the SN of the duplicated data block is less than the maximum status transmit state variable, one status report may be triggered even if a plurality of duplicated data blocks are present.

The method may further include triggering the status report if the duplicated data block requests the status report and the SN of the duplicated data block is out of the receiving window.

The method may further include triggering the status report if the duplicated data block requests the status report and the SN of the duplicated data block is less than the maximum status transmit state variable.

The method may further include discarding a previously received data block after receiving the duplicated data block.

The duplicated data block may be a radio link control (RLC) protocol data unit (PDU).

In another aspect, a receiver includes a radio frequency (RF) unit for receiving and transmitting a radio signal, and a processor operatively coupled with the RF unit, having a radio link control (RLC) entity and configured to receive a duplicated data block, and suspend a triggering of a status report if the duplicated data block requests the status report and a sequence number (SN) of the duplicated data block is equal to or greater than a maximum status transmit state variable, the maximum status transmit state variable having a highest possible value of a SN that can be included in the status report.

Advantageous Effects of Invention

Even if a duplicated data block requests a status report, the status report is triggered after hybrid automatic repeat request (HARQ) reordering is complete, thereby effectively utilizing radio resources.

MODE FOR THE INVENTION

Figure 1:
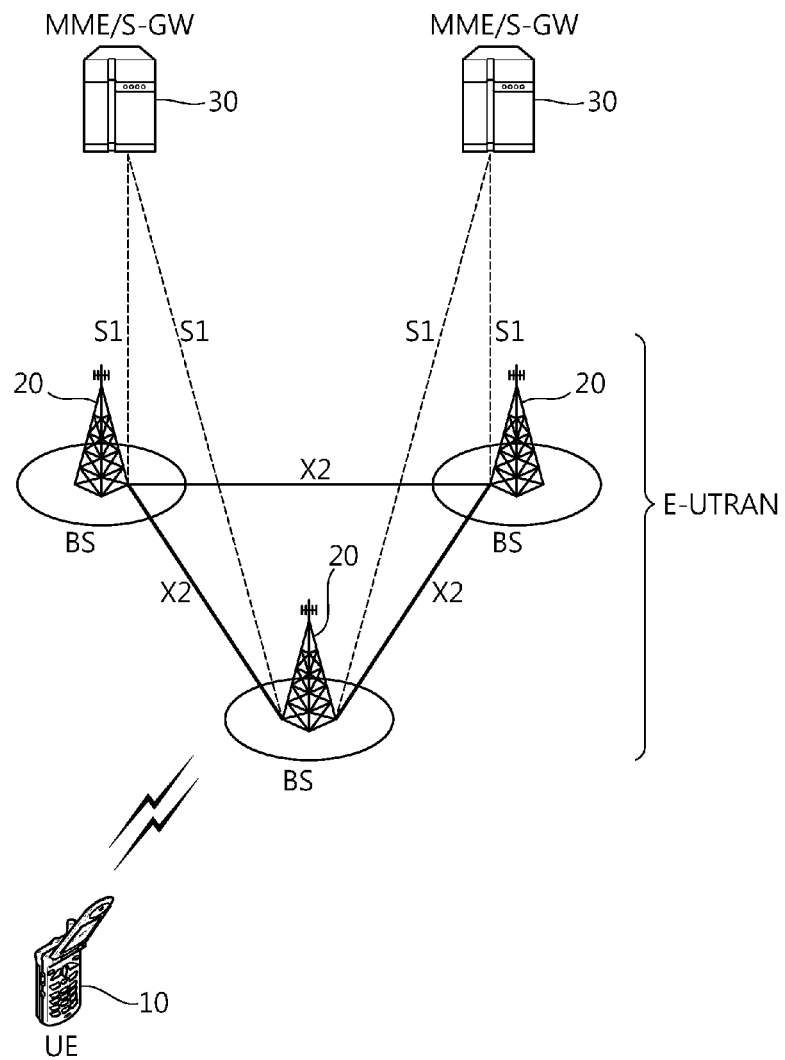
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
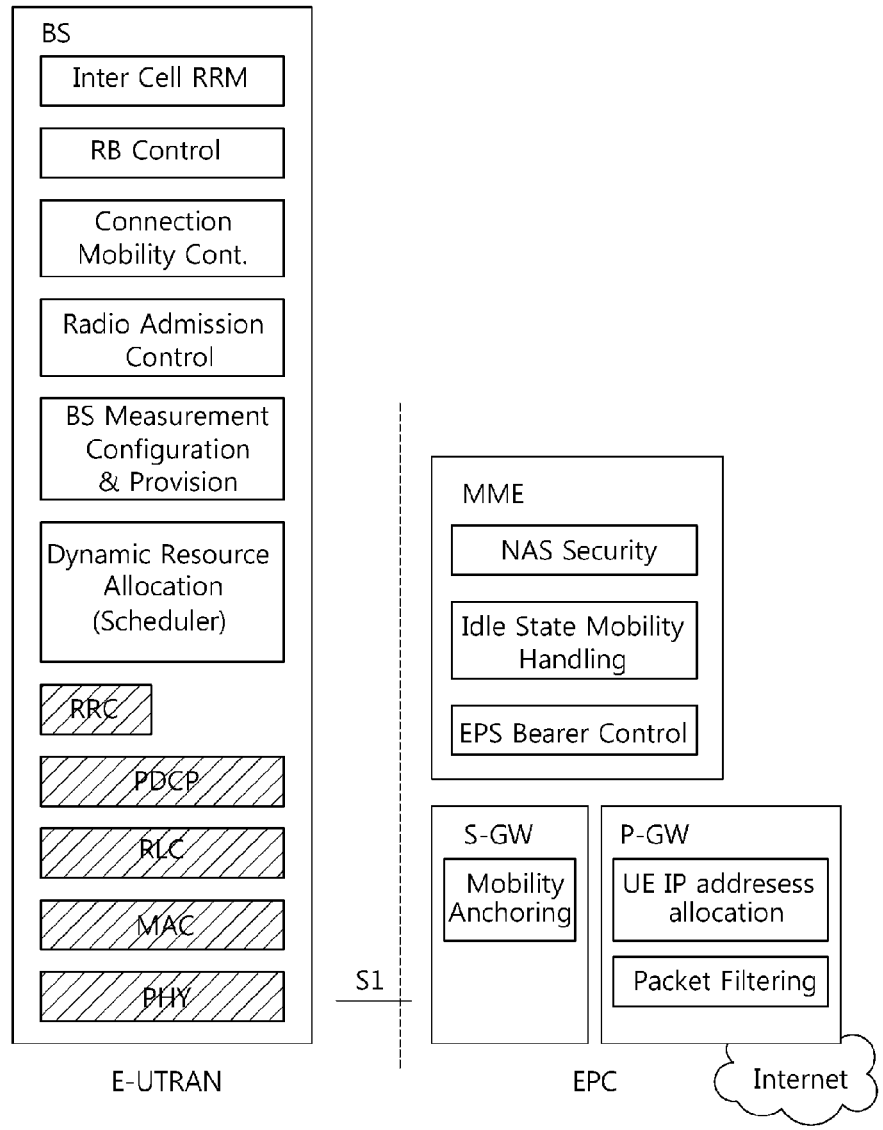
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane. A BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (interne protocol) allocation and (2) packet filtering.

Figure 3:
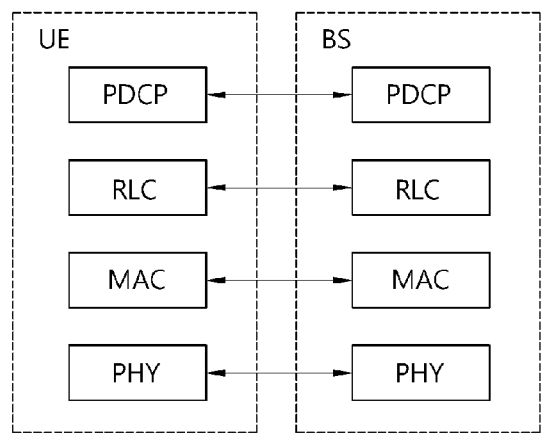
FIG. 3 is a block diagram showing radio protocol architecture for a user plane.
Figure 4:
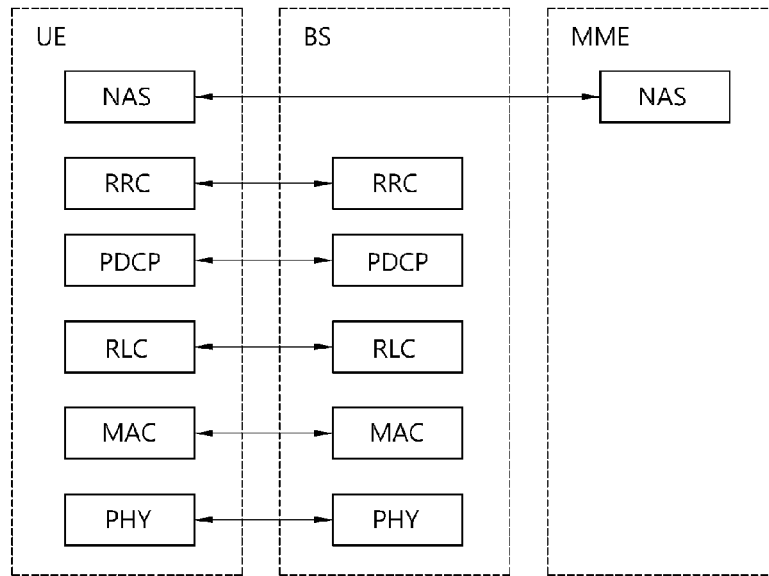
FIG. 4 is a block diagram showing radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface. Between different physical layers, i.e., the physical layer of a transmitter and the physical layer of a receiver, data are transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

A RRC (Radio Resource Control) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
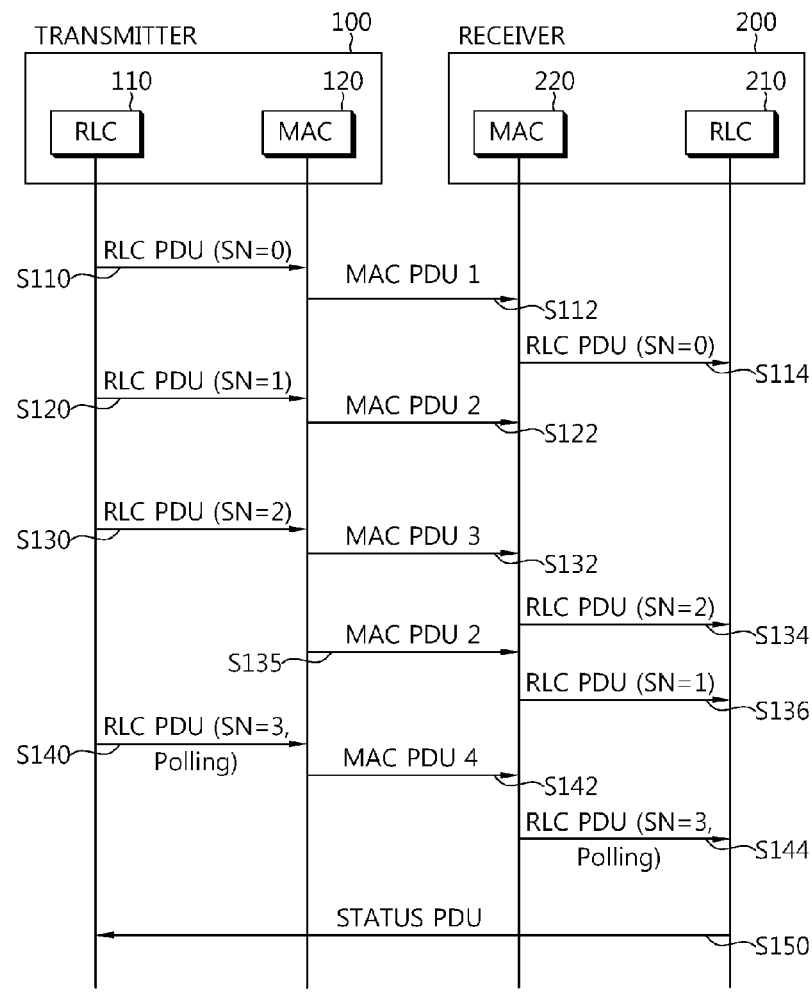
FIG. 5 is a flow diagram showing hybrid automatic repeat request (HARQ) and automatic repeat request (ARQ).

FIG. 5 is a flow diagram showing hybrid automatic repeat request (HARQ) and automatic repeat request (ARQ). An RLC entity 110 of a transmitter 100 transmits an RLC protocol data unit (PDU) with a sequence number (SN) of 0 to a MAC entity 120 (step S110). The MAC entity 120 of the transmitter 100 transmits a MAC PDU1(s) corresponding to the RLC PDU with SN=0 to a MAC entity 220 of a receiver 200 (step S112). Upon successfully receiving the MAC PDU, the MAC entity 220 sends the RLC PDU with SN=0 to an RLC entity 210 (step S114).

The RLC entity 110 of the transmitter 100 transmits an RLC PDU with SN=1 to the MAC entity 120 (step S120). The MAC entity 120 of the transmitter 100 transmits a MAC PDU2(s) corresponding to the RLC PDU with SN=1 to the MAC entity 220 of the receiver 200 (step S122). In this case, a wireless channel deteriorates and thus HARQ is performed on the MAC PDU2.

The RLC entity 110 of the transmitter 100 transmits an RLC PDU with SN=2 to the MAC entity 120 (step S130). The MAC entity 120 of the transmitter 100 transmits a MAC PDU3(s) corresponding to the RLC PDU with SN=2 to the MAC entity 220 of the receiver 200 (step S132). Upon successfully receiving the MAC PDU3, the MAC entity 220 transmits the RLC PDU with SN=2 to the RLC entity 210 (step S134).

An HARQ process performed on the MAC PDU2(s) corresponding to the RLC PDU with SN=1 is complete (step S135), and the RLC entity 210 obtains the RLC PDU with SN=1 (step S136). According to the HARQ process, the RLC entity 210 may receive an RLC PDU with a discontinuous SN. This is referred to as HARQ reordering.

The RLC entity 110 of the transmitter 100 transmits an RLC PDU with SN=3 to the MAC entity 120 (step S140). In this case, a polling bit is set in a header of the RLC PDU, and a status report is requested. The MAC entity 120 of the transmitter 100 transmits a MAC PDU4(s) corresponding to the RLC PDU with SN=3 to the MAC entity 220 of the receiver 200 (step S142). Upon successfully receiving the MAC PDU4, the MAC entity 220 transmits the RLC PDU with SN=3 to the RLC entity 210 (step S144). When the status report is requested, the RLC entity 210 constructs a status PDU and transmits the status PDU to the RLC entity 110 of the transmitter 100 (step S150).

Figure 6:
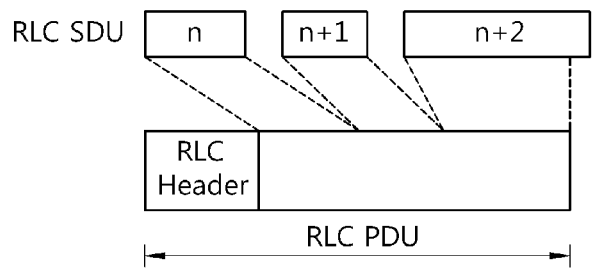
FIG. 6 shows a structure of a radio link control (RLC) protocol data unit (PDU).

FIG. 6 shows a structure of an RLC PDU. The RLC PDU includes an RLC header and a data field. The data field includes at least one RLC service data unit (SDU) and/or at least one RLC SDU segment. The RLC SDU is an upper-layer data block obtained by an RLC layer from an upper layer. The RLC PDU is a data block constructed by the RLC layer. Herein, n-th, (n+1)-th, and (n+2)-th RLC SDU segments are constructed for exemplary purposes only.

An RLC entity supporting ARQ is referred to as an acknowledged mode (AM) RLC entity. The AM RLC of a receiver requests retransmission of an RLC PDU which is unsuccessfully received by the receiver, and is used for the purpose of supporting an error-free data rate by using retransmission. The AM RLC is used in a user plane mainly for real-time packet data transmission of a packet-switched (PS) domain, and is used in a control plane for RRC message transmission in which reception acknowledgment is required. The RLC PDU used by the AM RLC can be classified into an AM data (AMD) PDU that is an RLC data PDU used for data transmission and an RLC control PDU used for data transmission control. The RLC control PDU includes a status PDU carrying status information.

The RLC data PDU can be further classified into an AMD PDU and an AMD PDU segment. The AMD PDU segment has a part of data belonging to the AMD PDU. In a 3-rd generation partnership project (3GPP) long term evolution (LTE) system, a maximum size of a data block that can be transmitted by a user equipment is changeable every time. Assume that an AM RLC of a transmitter constructs an AMD PDU having a size of 200 bytes at a certain time, and thereafter the transmitter receives negative-acknowledgment (NACK) from the AM RLC of the receiver and thus retransmits the AMD PDU. In this case, if a maximum size of an actually transmittable data block is 100 bytes, the AMD PDU cannot be retransmitted without alternation. The AMD PDU segment is used in this case. The AMD PDU segment implies small fragmented parts of an AMD PDU. The AM RLC of the transmitter divides an original AMD PDU requiring retransmission into AMD PDU segments, and transmits the AMD PDU segments for several time durations. The AMD RLC of the receiver restores the original AMD PDU from the received AMD PDU segments.

Figure 7:
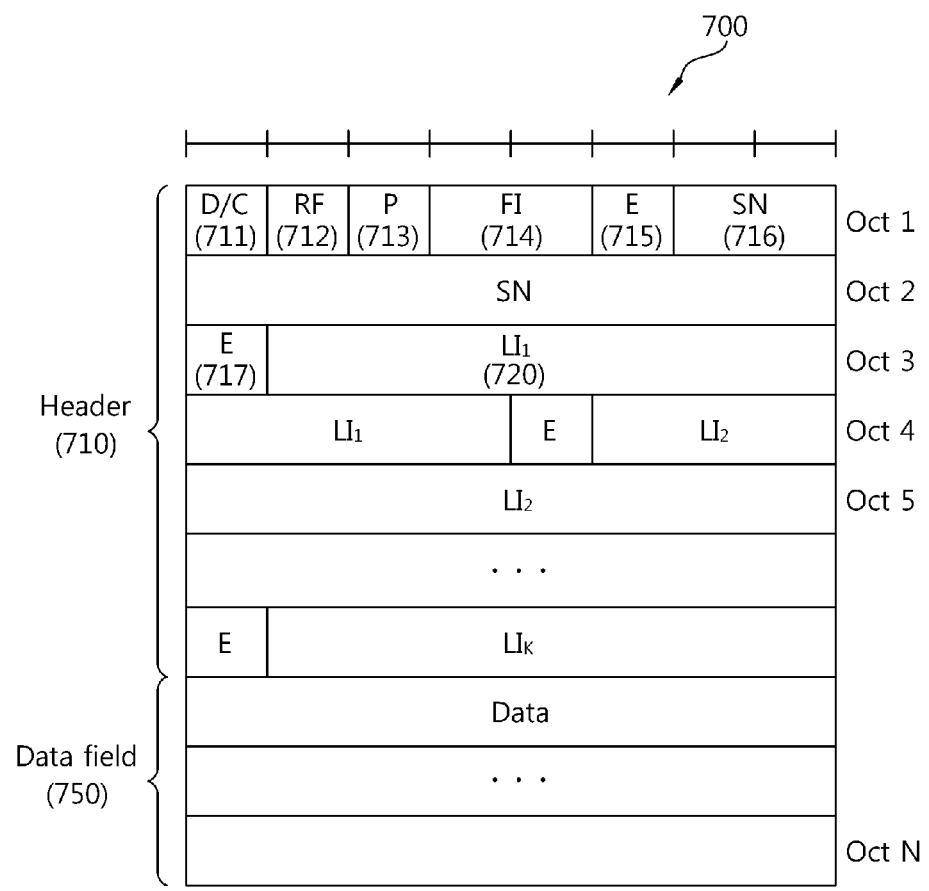
FIG. 7 shows an example of an acknowledged mode data (AMD) PDU.

FIG. 7 shows an example of an AMD PDU. An AMD PDU 700 includes a header 710 and a data field 750. The header 710 includes a fixed part (fields that are present for every AMD PDU 700) and an extended part (fields that are present for the AMD PDU 700 when necessary). The fixed part of the header is byte aligned and includes a D/C (Data/Control) field 711, a RF (Re-segmentation Flag) field 712, a P (Polling bit) field 713, an FI (Framing Info) field 714, an E (Extension bit) field 715 and an SN (Sequence Number) field 716. The extended part of the header itself is byte aligned and includes an E field 717 and an LI (Length Indicator) field 720. The header includes an extended part only when more than one data field elements are present in the AMD PDU 700, in which case the E field 717 and the LI field 720 are present for every data field element except the last.

The data field 750 includes at least one data field element. A data field element may include one or more RLC SDU segments and/or one or more RLC SDUs.

The D/C field 711 indicates whether the RLC PDU is an RLC data PDU or RLC control PDU. The RF field 712 indicates whether the RLC PDU is an AMD PDU or AMD PDU segment. The P field 713 indicates whether or not the transmitting side of an AM RLC entity requests a status report from its peer AM RLC entity. The FI field 714 indicates whether the RLC SDU is segmented at the beginning and/or at the end of the data field. Specifically, the FI field 714 indicates whether the first byte of the data field corresponds to the first byte of the RLC SDU, and whether the last byte of the data field corresponds to the last byte of the RLC SDU. The E field 715 in the fixed part indicates whether data field follows. The E field 717 in the extended part indicates whether a set of E field and LI field follows.

The SN field 716 indicates the sequence number of the AMD PDU 700. For an AMD PDU segment, the SN field 716 indicates the sequence number of the original AMD PDU from which the AMD PDU segment was constructed from.

The LI field 720 indicates the length in bytes of the corresponding data field element present in the RLC data PDU delivered/received by an AM RLC entity. The first LI present in the RLC data PDU header corresponds to the first data field element present in the data field of the RLC data PDU, the second LI present in the RLC data PDU header corresponds to the second data field element present in the data field of the RLC data PDU, and so on.

A header in an AMD PDU segment may further include an LSF (Last Segment Flag) field and an SO (Segment Offset) field. The LSF field indicates whether or not the last byte of the AMD PDU segment corresponds to the last byte of an AMD PDU. The SO field can indicate the position of the AMD PDU segment in bytes within the original AMD PDU. Specifically, the SO field can indicate the position within the data field of the original AMD PDU to which the first byte of the data field of the AMD PDU segment corresponds.

Figure 8:
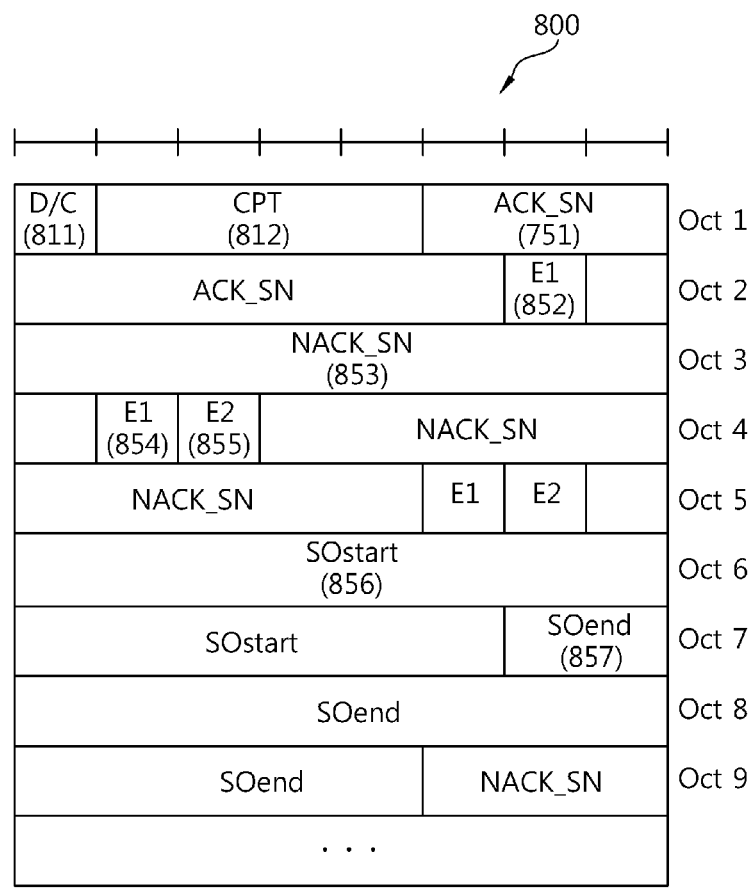
FIG. 8 shows an example of a status PDU.

FIG. 8 shows an example of a status PDU. A status PDU 800 used to report a status report includes a control PDU header and a payload. The control PDU header includes a D/C field 811 and a CPT (Control PDU Type) field 812. The CPT field 812 indicates the type of the RLC control PDU. Specifically, the CPT field 812 indicates whether the RLC control PDU is the status PDU.

The payload includes an ACK_SN (Acknowledgement SN) field 851 and one E1 (Extension bit 1) field 852, zero or more sets of a NACK_SN (Negative Acknowledgement SN) field 853, an E1 field 854 and an E2 (Extension bit 2) field 855, and possibly a set of an SOstart field 856 and an SOend field 857 for each NACK_SN.

The ACK_SN field 851 indicates the SN of the next not received RLC Data PDU which is not reported as missing in the status PDU 800. When the transmitting side of an AM RLC entity receives the status PDU 800, it interprets that all AMD PDUs up to but not including the AMD PDU with SN=ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend.

The E1 field 852 indicates whether or not a set of NACK_SN 853, E1 854 and E2 855 follows. The NACK_SN field 853 indicates the SN of the AMD PDU (or portions of it) that has been detected as lost at the receiving side of the AM RLC entity. The E2 field 855 indicates whether or not a set of SOstart 856 and SOend 857 follows. The SOstart field 856 indicates the portion of the AMD PDU with SN=NACK_SN (the NACK_SN for which the SOstart is related to) that has been detected as lost at the receiving side of the AM RLC entity. Specifically, the SOstart field 856 indicates the position of the first byte of the portion of the AMD PDU in bytes within the data field of the AMD PDU. The SOend field 857 indicates the portion of the AMD PDU with SN=NACK_SN (the NACK_SN for which the SOend is related to) that has been detected as lost at the receiving side of the AM RLC entity. Specifically, the SOend field 857 indicates the position of the last byte of the portion of the AMD PDU in bytes within the data field of the AMD PDU.

Receive State Variable: VR(R)

This state variable holds the value of the SN following the last in-sequence completely received AMD PDU, and it serves as the lower edge of the receiving window. This indicates the first AMD PDU among AMD PDUs which are not completely received by the receiving side of the AM RLC entity. It is initially set to 0, and is updated whenever the AM RLC entity receives an AMD PDU with SN=VR(R).

Maximum Acceptable Receive State Variable: VR(MR)

This state variable equals VR(R)+AM_Window_Size, where AM_Window_Size denotes the size of the receiving window, and it holds the value of the SN of the first AMD PDU that is beyond the receiving window and serves as the higher edge of the receiving window.

Reordering State Variable: VR(X)

This state variable holds the value of the SN following the SN of the RLC data PDU which triggered a reordering timer. The reordering timer is used to detect loss of RLC PDUs at lower layer and is started when out-of sequence RLC data PDU is received. A status report is triggered when the reordering timer is expired.

Maximum STATUS Transmit State Variable: VR(MS)

This state variable holds the highest possible value of the SN which can be indicated by "ACK_SN" when a status PDU needs to be constructed. This may hold the highest possible value of the SN that can be included in a status report. This may hold the highest possible value of the SN in a status transmitting window which is VR(R)<=SN<VR(MS). VR(MS) is updated to the SN of the first AMD PDU with SN>current VR(MS) for which not all byte segments have been received when all byte segments of the AMD PDU with SN=VR(MS) are received. When the reordering timer is expired, VR(MS) is updated to the SN of the first AMD PDU with SN>=VR(X) for which not all byte segments have been received.

Highest Received State Variable: VR(H)

This state variable holds the value of the SN following the SN of the RLC data PDU with the highest SN among received RLC data PDUs. This may hold the SN of the first RLC data PDU which is not received by the receiving side of the AM RLC entity. VR(H) is updated to the SN following the SN of a RLC data PDU when the RLC data PDU with SN>=VR(H) is received.

Figure 9:
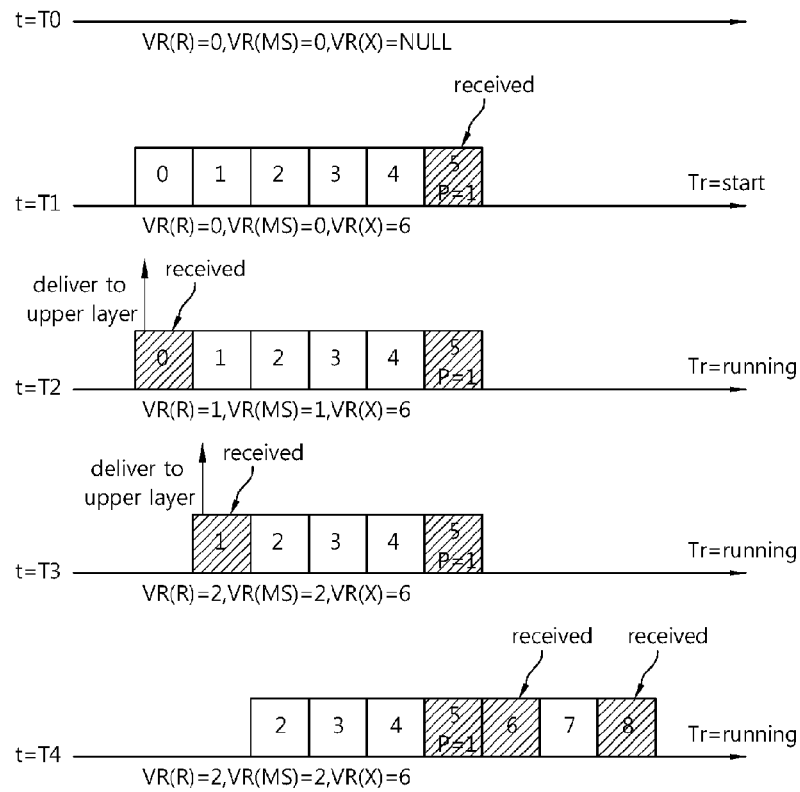
FIG. 9 shows an example of status report triggering.

FIG. 9 shows an example of status report triggering. At t=T0, each status variable has an initial value in an initial state. That is, VR(R)=0, VR(MS)=0, and VR(X)=NULL. It is assumed that a size of a receiving window is sufficiently large. VR(H) is not shown herein.

At t=T1, an AMD PDU with SN=5 is received. Since a first AMD PDU, i.e., an AMD PDU with SN=0, is not received, VR(R) and VR(MS) remain to 0. Since SN=5 is greater than VR(X) at this moment, the AMD PDU with SN=5 is out of sequence. Therefore, VR(X) is updated to VR(X)=6, and a reordering timer Tr is initiated. In this case, a status report is requested by setting a P field of the AMD PDU with SN=5 (indicated by 'P=1' in FIG. 9). The status report is not immediately triggered since previous AMD PDUs may be being received (this is referred to as an HARQ reordering status). Thus, triggering is suspended until the reordering timer expires.

At t=T2, an AMD PDU with SN=0 is received. VR(R) and VR(MS) are both updated to 1, and the AMD PDU with SN=0 is delivered to an upper layer. VR(X) remains to VR(X)=6, and the reordering timer Tr is being operating.

At t=T3, an AMD PDU with SN=1 is received. VR(R) and VR(MS) are both updated to 2, and the AMD PDU with SN=1 is delivered to an upper layer. VR(X) remains to VR(X)=6, and the reordering timer Tr is being operating.

At t=T4, an AMD PDU with SN=6 and an AMD PDU with SN=8 are received. There is no change in VR(R), VR(MS), and VR(X).

At t=T5, the reordering timer Tr expires. First, VR(MS) is updated to 7 that is an SN value of a first incompletely received AMD PDU among AMD PDUs with SNs greater than or equal to VR(X). Further, VR(X) is set to VR(H), and herein VR(X)=9. Since VR(MS)>=5, the status report is triggered. In this case, a status PDU 900 is constructed based on information regarding a PDU between VR(R)=2 to VR(MS)=7. A value of an ACK_SN field is 7, and values of three NACK_SN fields are respectively 2, 3, and 4. When the number of received AMD PDUs is greater than or equal to the updated VR(MS), the reordering timer restarts. Since the AMD PDU with SN=8 has already been received, the reordering timer restarts.

Upon receiving the status PDU 900, an AM RLC entity of a transmitter analyzes a receiving buffer condition as follows.

(1) AMD PDUs which are unsuccessfully received by a receiver are AMD PDUs with SNs 2, 3, and 4.

(2) Since ACK_SN=7, AMD PDUs with SNs 0, 1, 5, and 6 not belonging to NACK_SN among AMD PDUs 0 to 6 are successfully transmitted.

(3) VT(A) is a status variable at a start point of a transmitting window and is updated from 0 to 2. VT(A) is an SN of an AMD PDU for which positive acknowledgement needs to be first received in-sequence at a next time, and corresponds to the start point of the transmitting window.

Figure 10:
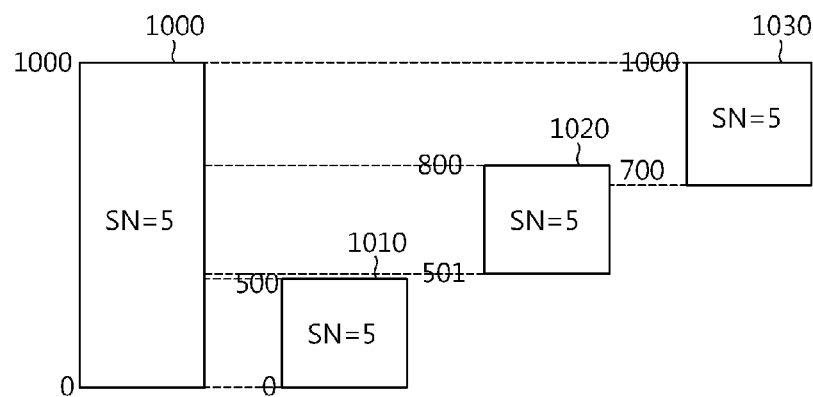
FIG. 10 shows an example of a duplicated data block.

Now, a case where an AMD PDU is duplicatively received will be described. Duplication of the AMD PDU implies that all or some of AMD PDUs with the same SN are duplicatively received. FIG. 10 shows an example of a duplicated data block. Assume that an AMD PDU with SN=5 has a total size of 1000 bytes, and a first AMD PDU segment 1010 with SN=5 is first received with 0 to 500 bytes. Next, even if a second AMD PDU segment 1020 is received with 501 to 800 bytes, the second AMD PDU segment 1020 is not duplicated to the first AMD PDU segment 1010. When a third AMD PDU segment 1030 with SN=5 is received with 700 to 1000 bytes, a certain portion of the second AMD PDU segment 1020 is duplicated, and thus the third AMD PDU segment 1030 is duplicated to the second AMD PDU segment 1020.

Figure 11:
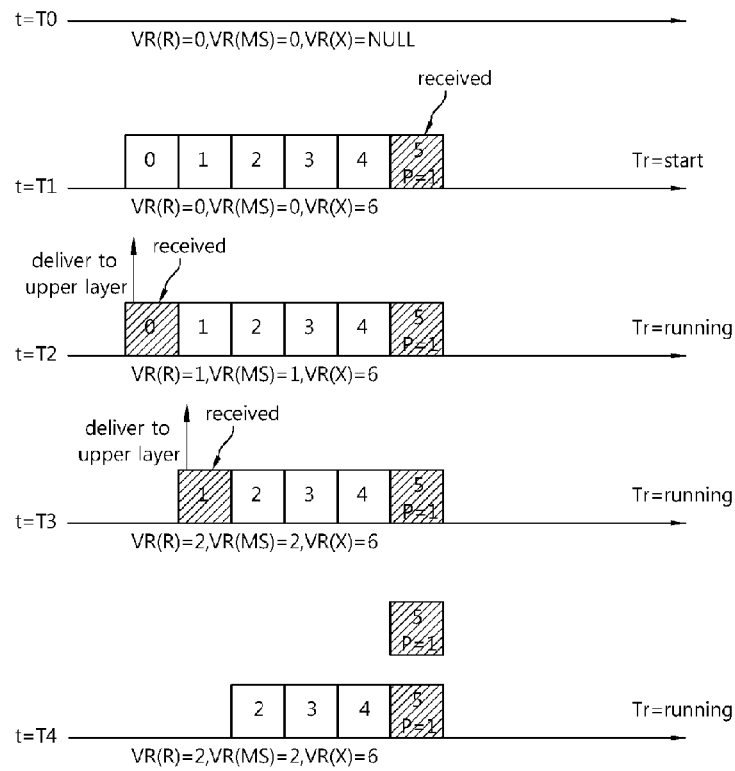
FIG. 11 shows status report triggering according to duplicated reception.

FIG. 11 shows status report triggering according to duplicated reception. Operations from t=T0 to t=T3 are the same as those of the example of FIG. 9. At t=T4, a P field requests a status report, and an AMD PDU with SN=5 is duplicatively received. Upon receiving the duplicated AMD PDU, the status report is immediately triggered. Even if the P field requests the status report, the status report is suspended for HARQ reordering upon receiving an AMD PDU with an SN of VR(MS)<=SN<VR(MR), but the status report is immediately triggered when the AMD PDU is duplicated to a previously received AMD PDU. This the same as the method proposed in 3GPP CR (Change Request) Document R2-084784 "Clarification of Triggering Conditions for Status Reports".

Duplicated reception of the AMD PDU is mainly caused by the occurrence of an HARQ ACK-to-NACK error in an HARQ entity that is a lower layer of the RLC layer. Therefore, since the duplicatively received AMD PDU is identical to a first received AMD PDU, if a P field is set in the first received AMD PDU, a P field of the duplicatively received PDU is also set in general. If a status report is immediately triggered without waiting for HARQ reordering with respect to the duplicatively received PDU, the following problems occur.

First, even for an AMD PDU for which HARQ reordering is being performed, NACK may be determined and thus the status report may be transmitted. For example, in the example of FIG. 11, assume that an AMD PDU with SN=4 is received at t=T5 after the status report is triggered at t=T4. The status report is constructed with NACK for SNs 2 to 4, and thus there is a problem in that a transmitter unnecessarily retransmits the AMD PDU with SN=4.

Second, after the status report is triggered by the duplicatively received AMD PDU, the status report is triggered one more time at a time when an SN of the first received AMD PDU is less than VR(MS), and thus there is a problem in that the status report is unnecessarily transmitted.

Figure 12:
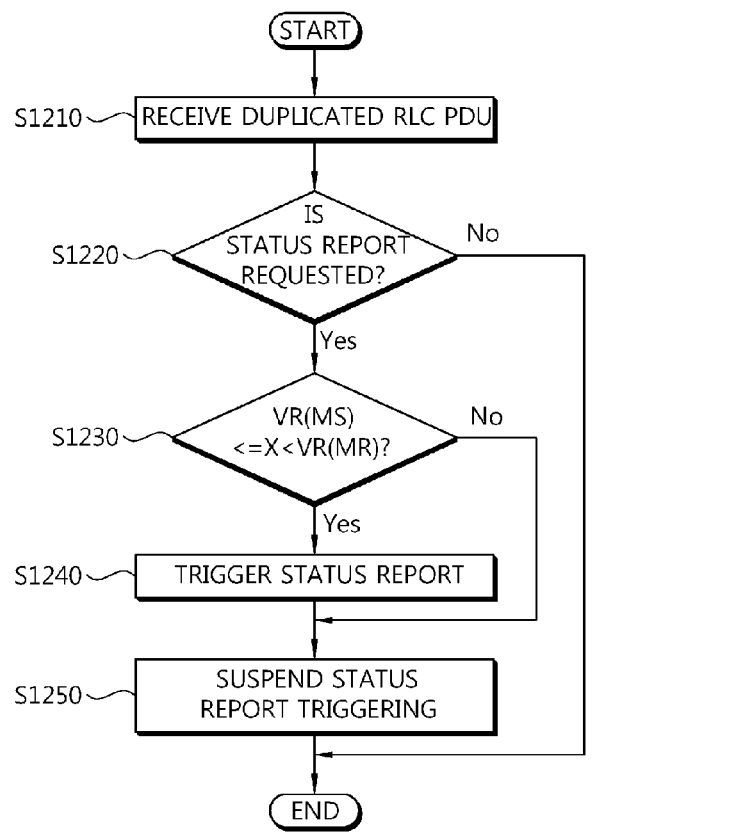
FIG. 12 is a flowchart showing a method of transmitting a status report according to an embodiment of the present invention.

FIG. 12 is a flowchart showing a method of transmitting a status report according to an embodiment of the present invention. In step S1210, a receiver receives an RLC PDU duplicated to a previously received RLC PDU. Upon receiving the duplicated RLC PDU, the previously received RLC PDU can be discarded from a receiving buffer. In step S1220, the receiver determines whether a status report is requested from a P field included in a header of the duplicated RLC PDU. In this case, irrespective of the status report request of the previously received RLC PDU, whether the status report is requested can be determined according to whether a status report is requested from a last received duplicated RLC PDU.

In step S1230, when the duplicated RLC PDU requests the status report, it is determined whether an SN of the duplicated RLC PDU exists inside a detection window. The detection window is used to determine whether x has a value equal to or greater than VR(MS) in a receiving window. If x denotes the SN of the duplicated RLC PDU, the SN exists inside the detection window when VR(MS)<=x<VR(MR) is satisfied. As a reference time, the detection window may use a time when the duplicated RLC PDU is received. That is, values of VR(MS) and VR(MR) to be compared with SN=x may be values of VR(MS) and VR(MR) at a time when the duplicated RLC PDU is received. The values of the status variables VR(MS) and VR(MR) can be updated if necessary, after determining whether the duplicated RLC PDU exists inside the receiving window.

If the SN of the duplicated RLC PDU exists outside the detection window, the status report is immediately triggered in step S1250. If the duplicated RLC PDU exists inside the detection window, triggering of the status report is suspended in step S1240, and the status report is triggered in step S1250. The status report triggering can be suspended until x<VR(MS) is satisfied. The status PDU can be constructed after updating VR(MS) and VR(MR) if necessary, on the basis of the duplicated RLC PDU.

If SN=x and VR(MS)<=x<VR(MR) and even if an RLC PDU in which a P field is set is duplicatively received several times, the receiver can trigger the status report only one time at a time when x<VR(MS) is satisfied. Therefore, an unnecessary status report can be reduced, and an overhead caused by transmission of the status report can be reduced.

Figure 13:
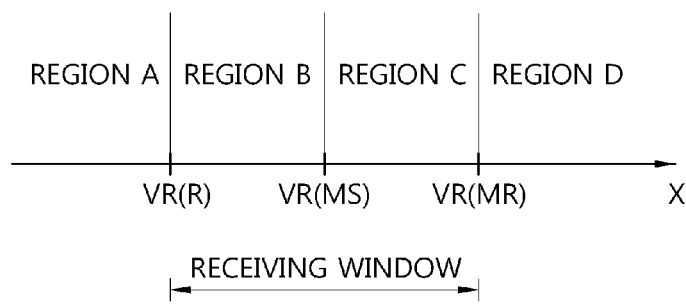
FIG. 13 shows a region where a status report is triggered.

FIG. 13 shows a region where a status report is triggered. When a duplicated RLC PDU requests the status report, if an SN x of the duplicated RLC PDU belongs to a region C, status report triggering is suspended until x<VR(MS) is satisfied. When the SN x of the duplicated RLC PDU belongs to any one of regions A, B, and C, the status report is immediately triggered.

Figure 14:
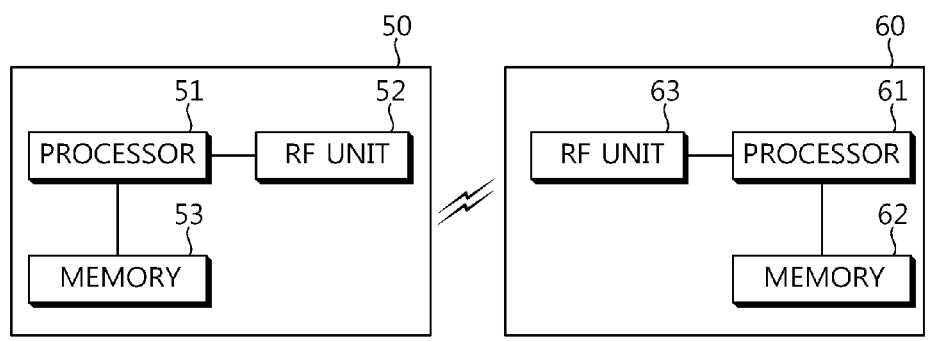
FIG. 14 is a block diagram showing wireless communication system to implement an embodiment of the present invention.

FIG. 14 is a block diagram showing wireless communication system to implement an embodiment of the present invention. A transmitter 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A receiver 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the protection.

The invention claimed is:

1. A method of triggering a status report in a wireless communication system, the method comprising:
receiving a duplicated data block,
wherein the reception of the duplicated data block indicates that all or some of data blocks with a same sequence number are duplicatively received;
suspending a triggering of the status report if the duplicated data block requests the status report and a sequence number (SN) of the duplicated data block is equal to or greater than a maximum status transmit state variable,
wherein the triggering of the status report is suspended until the SN of the duplicated data block is less than the maximum status transmit state variable,
wherein the maximum status transmit state variable has a highest possible value of an SN that can be included in the status report, and
wherein the duplicated data block is a radio link control (RLC) protocol data unit (PDU); and
triggering the status report if the duplicated data block requests the status report and the SN of the duplicated data block is less than the maximum status transmit state variable.

2. The method of claim 1, wherein the SN of the duplicated data block is within the receiving window.

3. The method of claim 1, wherein, if the SN of the duplicated data block is less than the maximum status transmit state variable, one status report is triggered even if a plurality of duplicated data blocks are present.

4. The method of claim 1, further comprising:
triggering the status report if the duplicated data block requests the status report and the SN of the duplicated data block is out of the receiving window.

5. The method of claim 1, further comprising: discarding a previously received data block after receiving the duplicated data block.

6. A receiver comprising:
a radio frequency (RF) unit for receiving and transmitting a radio signal; and
a processor operatively coupled with the RF unit, having a radio link control (RLC) entity and configured to:
receive a duplicated data block,
wherein the reception of the duplicated data block indicates that all or some of data blocks with a same sequence number are duplicatively received;
suspend a triggering of a status report if the duplicated data block requests the status report and a sequence number (SN) of the duplicated data block is equal to or greater than a maximum status transmit state variable,
wherein the processor is further configured to suspend the triggering of the status report until the SN of the duplicated data block is less than the maximum status transmit state variable,
wherein the maximum status transmit state variable has a highest possible value of an SN that can be included in the status report, and
wherein the duplicated data block is a radio link control (RLC) protocol data unit (PDU); and
trigger the status report if the duplicated data block requests the status report and the SN of the duplicated data block is less than the maximum status transmit state variable.

7. The receiver of claim 6, wherein, if the SN of the duplicated data block is less than the maximum status transmit state variable, the processor is further configured to trigger one status report even if a plurality of duplicated data blocks are present.

8. The receiver of claim 6, wherein the processor is further configured to trigger the status report if the duplicated data block requests the status report and the SN of the duplicated data block is out of the receiving window.

9. The receiver of claim 6, wherein the processor is further configured to discard a previously received data block after receiving the duplicated data block.

* * * * *